United States Patent
Nicholson

(10) Patent No.: US 10,221,650 B2
(45) Date of Patent: Mar. 5, 2019

(54) HYDRAULIC POSITION INDICATOR SYSTEM

(71) Applicant: M-I L.L.C., Houston, TX (US)

(72) Inventor: Christopher D. Nicholson, Florence, KY (US)

(73) Assignee: M-I L.L.C., Houston, TX (US)

( * ) Notice: Subject to any disclaimer, the term of this patent is extended or adjusted under 35 U.S.C. 154(b) by 981 days.

(21) Appl. No.: 13/942,420

(22) Filed: Jul. 15, 2013

(65) Prior Publication Data
US 2014/0041861 A1 Feb. 13, 2014

Related U.S. Application Data

(60) Provisional application No. 61/671,196, filed on Jul. 13, 2012.

(51) Int. Cl.
| | |
|---|---|
| *E21B 34/02* | (2006.01) |
| *E21B 47/06* | (2012.01) |
| *E21B 21/10* | (2006.01) |
| *E21B 21/08* | (2006.01) |
| *F16K 37/00* | (2006.01) |

(52) U.S. Cl.
CPC ............ *E21B 34/02* (2013.01); *E21B 21/08* (2013.01); *E21B 21/106* (2013.01); *E21B 47/06* (2013.01); *F16K 37/0016* (2013.01)

(58) Field of Classification Search
CPC .......... E21B 34/02; E21B 21/08; E21B 21/10; E21B 21/106; E21B 47/06
See application file for complete search history.

(56) References Cited

U.S. PATENT DOCUMENTS

| | | | |
|---|---|---|---|
| 4,355,784 A | 10/1982 | Cain | |
| 5,802,638 A * | 9/1998 | Parker | A61G 7/018 5/600 |
| 6,253,787 B1* | 7/2001 | Suter | E21B 21/106 137/509 |
| 7,004,448 B2 | 2/2006 | Suter et al. | |
| 2001/0035220 A1* | 11/2001 | Russell | E21B 21/106 137/625.48 |
| 2006/0102355 A1* | 5/2006 | Ayres | E21B 33/068 166/310 |
| 2006/0237196 A1* | 10/2006 | Tips | E21B 23/04 166/375 |

(Continued)

*Primary Examiner* — David J Bagnell
*Assistant Examiner* — Tara E Schimpf
(74) *Attorney, Agent, or Firm* — Paula B. Whitten

(57) ABSTRACT

A system useful for monitoring or controlling the back pressure of fluid in a wellbore is disclosed. The system may include: a choke assembly including: a housing having an inlet, an outlet, and a bore; a choke member disposed in the bore for controlling a flow of a fluid from the inlet to the outlet, and a rod coupled to the choke member and extending through the housing; a cylinder including: a housing having an axial bore; a piston, directly or indirectly coupled to the rod, disposed in the axial bore and separating the axial bore into a first chamber and a second chamber; a position indicating device fluidly coupled to the second chamber, wherein a change in volume of fluid in the second chamber causes a corresponding change in volume of fluid in the position indicating device, thereby indicating a change in the position of the choke member.

12 Claims, 7 Drawing Sheets

(56) References Cited

U.S. PATENT DOCUMENTS

| | | | | |
|---|---|---|---|---|
| 2012/0001101 A1* | 1/2012 | Dietz | ................ | E21B 33/062 251/1.3 |
| 2012/0227983 A1* | 9/2012 | Lymberopoulos | ...... | E21B 34/02 166/373 |
| 2013/0146793 A1* | 6/2013 | Gustafson | ............ | E21B 33/062 251/1.3 |
| 2013/0343928 A1* | 12/2013 | McCarthy | ............ | E21B 43/126 417/379 |

\* cited by examiner

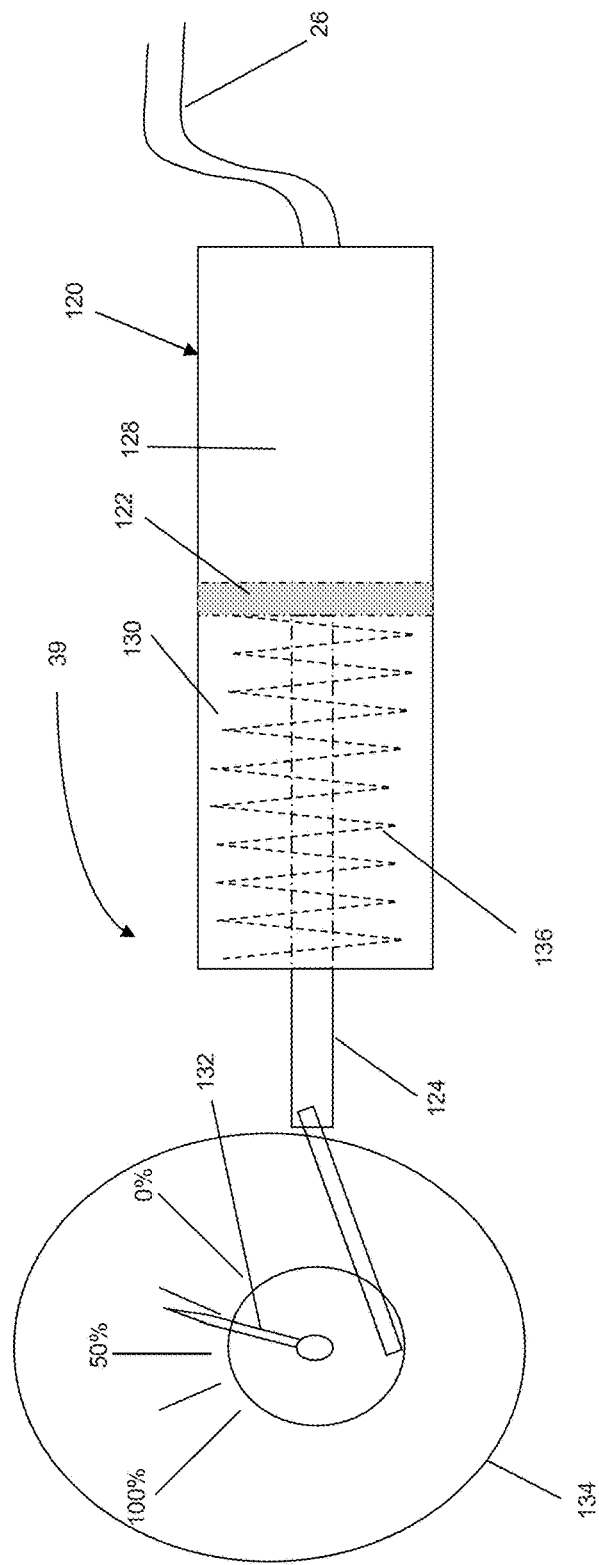

HYDRAULIC POSITION INDICATOR SYSTEM

CROSS-REFERENCE TO RELATED APPLICATIONS

This application claims benefit of U.S. provisional patent application Ser. No. 61/671,196, filed Jul. 13, 2012, which is herein incorporated by reference.

FIELD OF THE DISCLOSURE

In one aspect, embodiments disclosed herein relate to devices for monitoring or controlling the back pressure in a well or other subterranean boreholes. More specifically, embodiments disclosed herein relate to hydraulically operated position indicators directly or indirectly coupled to a choke system (i.e., a back pressure control device or a drilling choke).

BACKGROUND

There are many applications in which there is a need to control the back pressure of a fluid flowing in a system. For example, in the drilling of oil wells it is customary to suspend a drill pipe in the well bore with a bit on the lower end thereof and, as the bit is rotated, to circulate a drilling fluid, such as a drilling mud, down through the interior of the drill string, out through the bit, and up the annulus of the well bore to the surface. This fluid circulation is maintained for the purpose of removing cuttings from the well bore, for cooling the bit, and for maintaining hydrostatic pressure in the well bore to control formation gases and prevent blow-outs, and the like.

In those cases where the weight of the drilling mud is not sufficient to contain the bottom hole pressure in the well, it becomes necessary to apply additional back pressure on the drilling mud at the surface to compensate for the lack of hydrostatic head and thereby keep the well under control. Thus, in some instances, a back pressure control device is mounted in the return flow line for the drilling fluid.

Back pressure control devices are also necessary for controlling "kicks" in the system caused by the intrusion of salt water or formation gases into the drilling fluid which may lead to a blowout condition. In these situations, sufficient additional back pressure must be imposed on the drilling fluid such that the formation fluid is contained and the well controlled until heavier fluid or mud can be circulated down the drill string and up the annulus to kill the well. It is also desirable to avoid the creation of excessive back pressures which could cause the drill string to stick, or cause damage to the formation, the well casing, or the well head equipment.

The back pressure control devices, or drilling chokes, are typically placed near the well with remote control and monitoring stations. Local or visual position indicators for drilling chokes, such as those placed between the choke bonnet and the actuator, must attach directly to the drilling choke, which necessarily places the position indicator in a hazardous and harsh environment. For remote monitoring, drilling chokes are often provided with digital or pneumatic position indicators. Digital position indicators are electronic, requiring special certifications and construction to be suitable for the operating conditions. Pneumatic position indicators necessarily fail when system air pressure is lost.

SUMMARY OF THE DISCLOSURE

In one aspect, embodiments disclosed herein relate to a method of monitoring or controlling one or more operating pressures within a subterranean borehole that includes a choke assembly including a housing having an inlet, an outlet, a bore, a choke member disposed in the bore for controlling a flow of a fluid from the inlet to the outlet, and a rod coupled to the choke member and extending through the housing, the method including: providing a cylinder including: a housing having an axial bore; a first piston disposed in the axial bore and separating the axial bore into a first chamber and a second chamber; directly or indirectly coupling the rod of the choke assembly to the piston; fluidly coupling the second chamber to a position indicating device, wherein movement of the choke assembly causes a corresponding movement in the rod and the first piston, resulting in a change in a volume of fluid in the second chamber and a corresponding change in a volume of fluid in the position indicating device, thereby indicating a change in the position of the choke member; and determining a position of the choke member using the position indicating device.

In another aspect, embodiments disclosed herein relate to a fluid control or monitoring system, including: a choke assembly including: a housing having an inlet, an outlet, and a bore; a choke member disposed in the bore for controlling a flow of a fluid from the inlet to the outlet, and a rod coupled to the choke member and extending through the housing; a cylinder including: a housing having an axial bore; a piston, directly or indirectly coupled to the rod, disposed in the axial bore and separating the axial bore into a first chamber and a second chamber; a position indicating device fluidly coupled to the second chamber, wherein a change in a volume of fluid in the second chamber causes a corresponding change in a volume of fluid in the position indicating device, thereby indicating a change in the position of the choke member.

Other aspects and advantages will be apparent from the following description and the appended claims. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF DRAWINGS

FIGS. 5-9 are simplified schematic diagrams of choke position indicators according to embodiments disclosed herein that may be used with the systems and valves illustrated in FIGS. 1-4.

DETAILED DESCRIPTION

In one aspect, embodiments disclosed herein relate to devices for monitoring or controlling the back pressure in a well or other subterranean boreholes. More specifically, embodiments disclosed herein relate to hydraulically operated position indicators directly or indirectly coupled to a choke system (i.e., a back pressure control device or a drilling choke).

Figure 1:
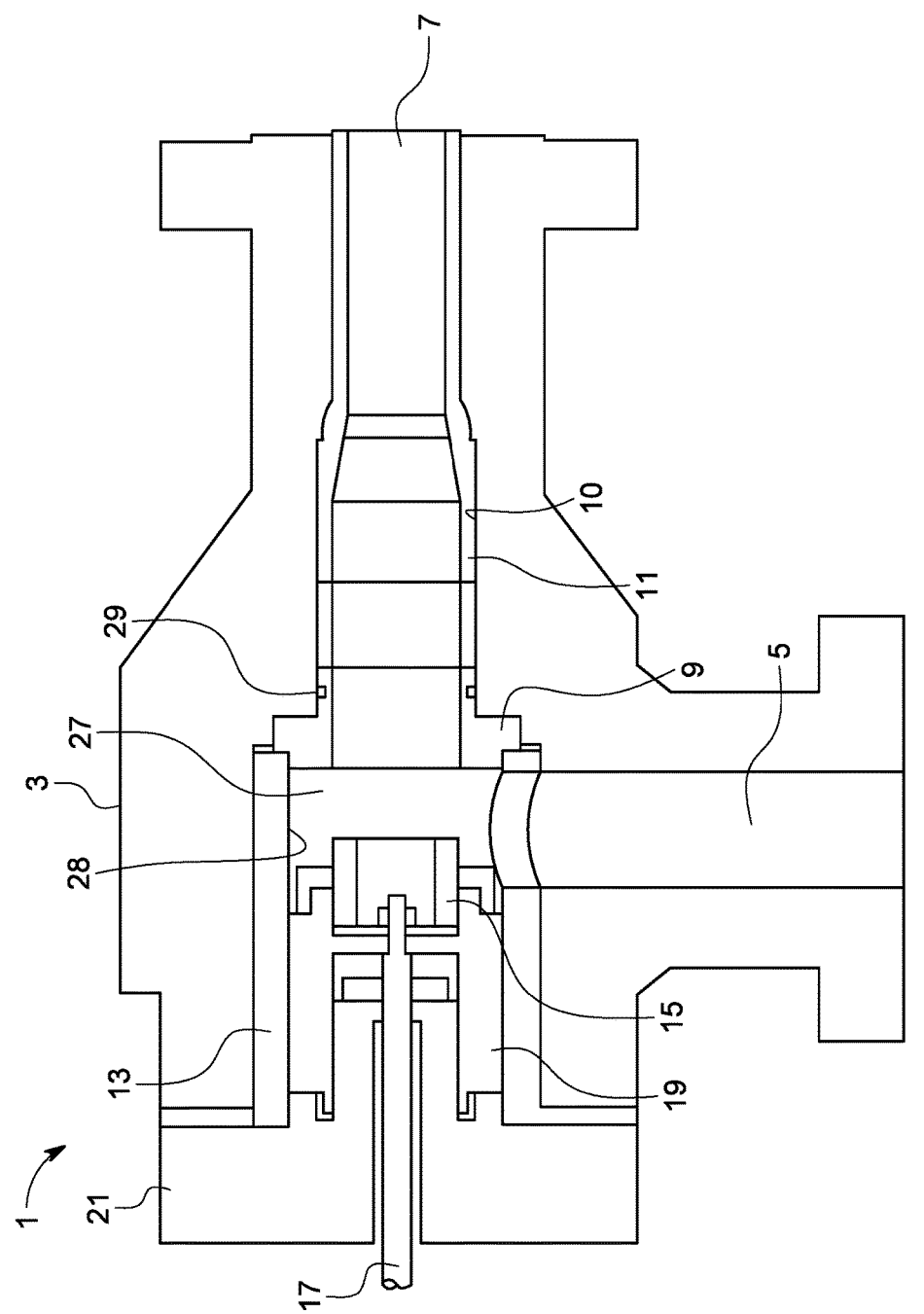
FIG. 1 is a simplified schematic diagram of a choke valve useful in embodiments disclosed herein.

Referring to FIG. 1, an example of a choke system useful in embodiments disclosed herein is illustrated. The choke valve 1 includes a choke housing 3, a bonnet 21, a shuttle assembly 19 including a mandrel (stem) 17 and a shuttle (dynamic trim) 15 mounted over the mandrel 17, a trim 9 having a flanged design and serving as a seat for the shuttle 15, a flange sleeve 13, and downstream trim components, such as a wear sleeve 11. Shuttle 15 may be slidably mounted over the mandrel 17 or may be rigidly mounted (through bolted) on mandrel 17, where the shuttle assembly sides into the bore. The choke housing 3 includes an inlet channel 5, an outlet channel 7, and a choke orifice 27. The trim 9 is kept in place by an o-ring 29 sealing the trim 9 to the housing 3 (and the flanged sleeve). The flange sleeve 13 and the shuttle assembly 19 are aligned within the choke valve 1 with respect to an inner wall 28 of choke orifice 27, and the trim 9 is aligned with an inner wall 10 of the outlet channel 7.

Figure 2:
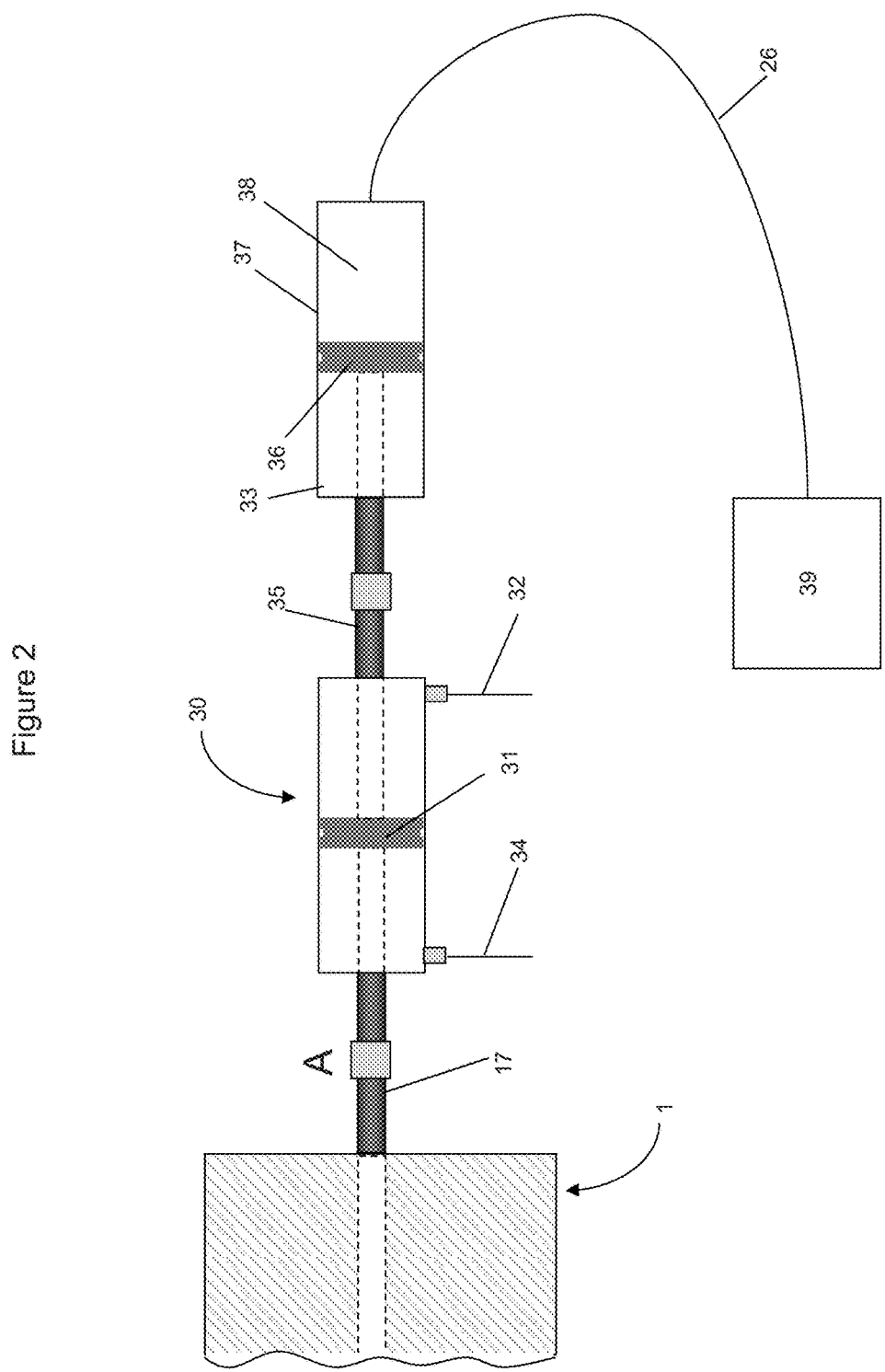
FIG. 2 is a simplified schematic diagram of a double-acting actuator coupled to the choke system of FIG. 1 and a choke position indicator system according to embodiments disclosed herein.

For the choke valve illustrated in FIG. 1, the position of the shuttle 15 may be controlled using an electronic, pneumatic, or hydraulic actuator coupled to the end of mandrel 17 extending from housing 3/bonnet 21. In other words, the back pressure applied to the fluid in inlet 5 may be controlled by the force applied to mandrel 17 by an electronic, pneumatic, or hydraulic actuator coupled to the end of mandrel 17. For example, as illustrated in FIG. 2, choke valve 1 operated with a double-acting actuator 30 may use air or hydraulic pressure acting upon piston 31 and mandrel 17 to both open and close the shuttle. To move the mandrel 17 toward the closed position, pressure may be applied to the "close" line 32 while venting the "open" line 34; to move piston 31 and mandrel 17 toward the open position, pressure may be applied to the "open" line 34 while venting the "close" line 32.

As noted in the Background section above, local and/or electronic (remote) position indicators (not shown) would normally be placed intermediate the bonnet of the choke valve 1 and the actuator 30, such as at position "A." In embodiments disclosed herein, however, actuator piston 31 is additionally coupled to rod 35, which may be directly or indirectly coupled to piston 36 in cylinder 37. Cylinder 37 includes a fluid disposed in chamber 38 that is fluidly coupled via flow line 26 to a remote position indicator device 39, which will be described in more detail below. Chamber 33 may be filled with air, and may be open to the atmosphere, assuming the piston seal is sufficiently designed. While FIG. 2 is described with respect to a double-acting actuator, one skilled in the art will readily appreciate that other actuators may similarly be designed to include a rod 35 for driving piston 36 and providing a remote position indication via hydraulic means.

Figure 3:
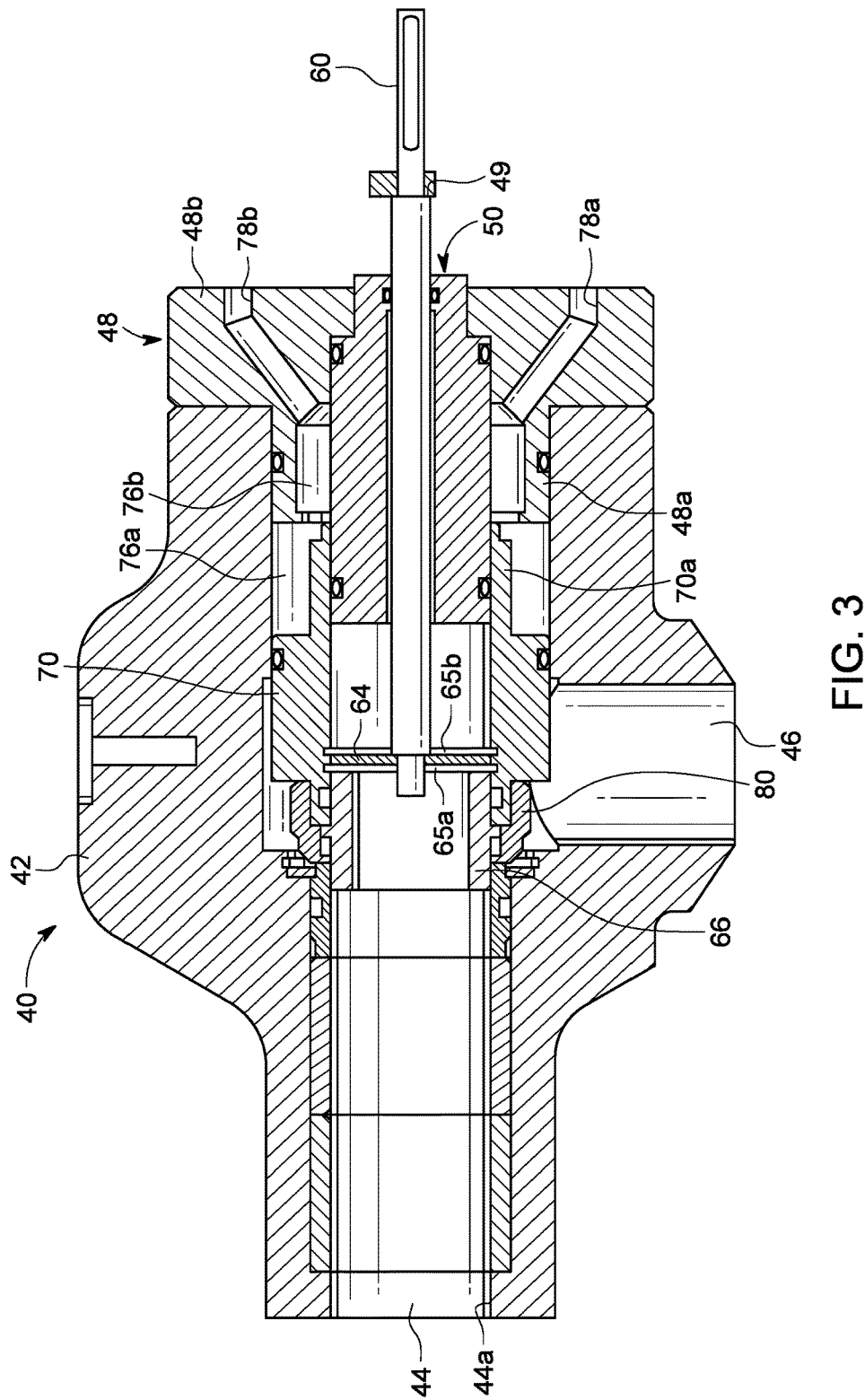
FIG. 3 is a simplified schematic diagram of a choke valve useful in embodiments disclosed herein.

Another choke system useful in embodiments disclosed herein is illustrated in FIG. 3, which provides a hydraulic back pressure control system. Choke system 40 includes a housing 42 having an axial bore 44 extending through its length and having a discharge end 44a. A radially extending inlet passage 46 is also formed in the housing 42 and intersects the bore 44. It is understood that connecting flanges, or the like, (not shown) may be provided at the discharge end 44a of the bore 44 and at the inlet end of the passage 46 to connect them to appropriate flow lines. Drilling fluid from a downhole well is introduced into the inlet passage 46, passes through the housing 42 and normally discharges from the discharge end 44a of the bore 44 for recirculation.

As shown, a bonnet 48 is secured to the end of the housing 42 opposite the discharge end 44a of the bore 44. The bonnet 48 is substantially T-shaped in cross section and has a cylindrical portion 48a extending into the bore 44 of the housing. The bonnet 48 also includes a cross portion 48b that extends perpendicular to the cylindrical portion 48a and is fastened to the corresponding end of the housing 42 by any conventional manner, for example, bonnet 48 may be threadedly or weldably connected to housing 42.

A mandrel 50 is secured in the end portion of the bonnet 48, and a rod 60 is slidably mounted in an axial bore extending through the mandrel 50. A first end portion of the rod 60 extends from a first end of the mandrel 50 and the bonnet 48, and a second end portion of the rod 60 extends from a second end of the mandrel 50 and into the bore 44.

A spacer 64 is mounted on the second end of the rod 60 in any known manner and may be disposed between two snap rings 65a and 65b. A cylindrical choke member 66 is disposed in the bore 44 with one end abutting the spacer 64. The choke member 66 is shown in its fully closed position in FIG. 2, wherein choke member 66 extends in the intersection of the bore 44 with the inlet passage 46 to control the flow of fluid from inlet passage 46 to bore 44.

A cylindrical shuttle 70 is slidably mounted over the mandrel 50. The shuttle 70 has a reduced-diameter portion 70a that defines, with the inner surface of the housing 42, a fluid chamber 76a. Another fluid chamber 76b is defined between the outer surface of the mandrel 50 and the corresponding inner surface of the bonnet portion 48a. The chambers 76a and 76b communicate and receive a control fluid from a passage 78a formed through the bonnet 48. Passage 78a is connected to a hydraulic system as described below for circulating the control fluid into and from the passage. A passage 78b may also be formed through the bonnet portion 48 for bleeding air from the system through a bleed valve, or the like (not shown), before operation. In this context, the control fluid is introduced into the passage 78a, and therefore, the chambers 76a and 76b, at a predetermined set point pressure.

The control fluid enters the chambers 76a and 76b and applies pressure against the corresponding exposed end portions of the shuttle 70. The shuttle 70 is designed to move by the force caused by the pressure of the control fluid from the chambers 76a and 76b at the predetermined set point pressure acting on the corresponding exposed end portions of the shuttle is equal to the force caused by the pressure of the drilling fluid in the passage 46 acting on the corresponding exposed end portions of the other end of the shuttle 70 and a retainer 80. Axial movement of the shuttle 70 over the fixed mandrel 50 causes corresponding axial movement of the choke member 66, and therefore the spacer 64 and the rod 60.

Other embodiments of choke valves that may be useful in embodiments disclosed herein may include actuated rod systems. For example, an air or hydraulic actuator may controllably move the rod, varying shuttle position to control system pressure. Other embodiments of choke valves that may be useful in embodiments disclosed herein may include those described in U.S. Pat. Nos. 4,355,784, 6,253, 787 and 7,004,448, assigned to the assignee of the present invention and incorporated by reference herein.

As shown in FIG. 3 and discussed above, upon movement of shuttle 70 in either direction, a corresponding movement in rod 60 results. By monitoring the position of the end of rod 60 that extends from housing 42/bonnet 48, a determination can be made not only as to relative position of the choke member 66 with respect to the choke seat, but also of the wear on the choke member and choke seat.

Figure 4:
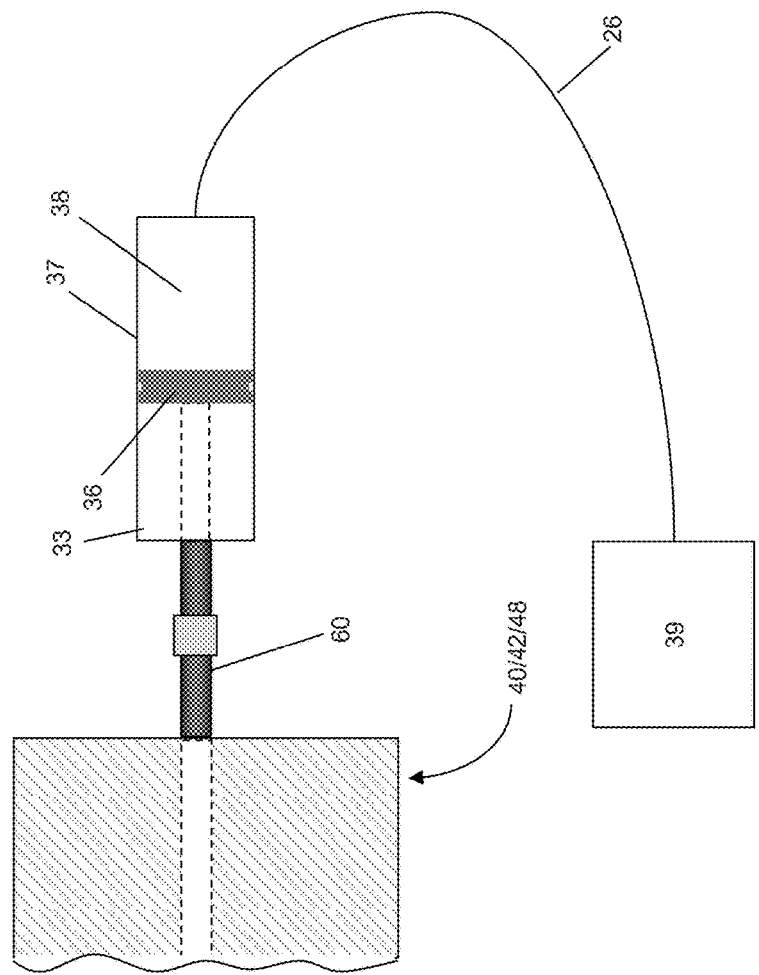
FIG. 4 is a simplified schematic diagram of the choke system of FIG. 3 coupled to a choke position indicator system according to embodiments disclosed herein.

As noted in the Background section above, local and/or electronic (remote) position indicators (not shown) would normally be coupled to rod 60. In embodiments disclosed herein, however, rod 60 may be directly or indirectly coupled to a piston 36 in cylinder 37, as shown in FIG. 4. Cylinder 37 includes a fluid disposed in chamber 38 that is fluidly coupled via flow line 26 to a remote position indicator device 39, which will be described in more detail below. Chamber 33 may be filled with air, and may be open to the atmosphere, assuming the piston seal is sufficiently designed.

Figure 5:
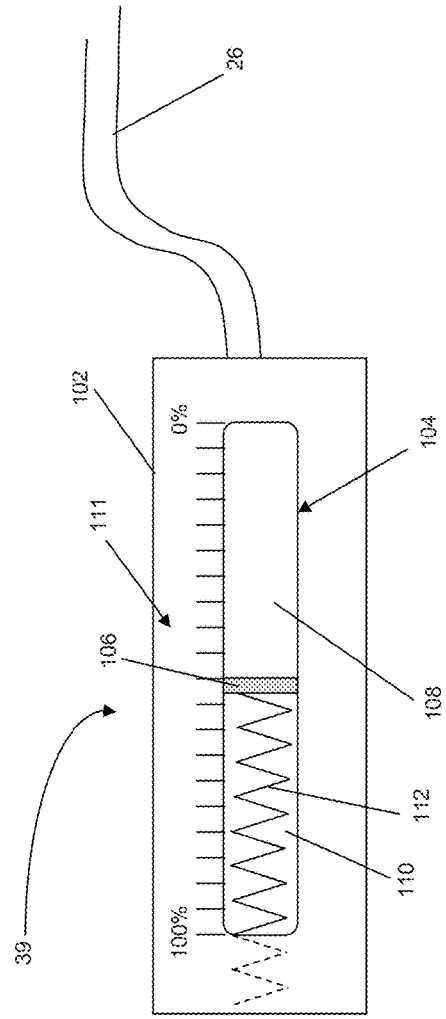

FIGS. 5-9 illustrate various embodiments for position indicator devices 39. Referring now to FIG. 5, flow line 26 is fluidly coupled to a position indicator 39, which, in this embodiment, includes a graduated cylinder 102 having a sight glass 104. Internally, cylinder 102 may include a piston 106 separating chambers 108, 110. As the back pressure control valve (e.g., 1, 40) opens, a volume of fluid is displaced from chamber 38 (FIGS. 2, 4) into chamber 108, which in turn moves piston 106; conversely, as the pressure control valve (1, 40) closes, fluid is pulled back into chamber 38 (FIGS. 2, 4) from chamber 108 causing a corresponding move for piston 106. Cylinder 102 may include graduations or markings 111 that, based on the relative volume of fluid in chambers 38 and 108 and the position of piston 106, provides an indication of the position of the valve (e.g., fully closed, 0%, fully open 100%, or therebetween). A spring 112 may also be provided to ensure that piston 106 returns to "zero" when the back pressure control valve completely closes. Similarly, a sight glass and graduations (not illustrated) on cylinder 37 (FIGS. 2, 4) may provide a local position indication.

Figure 6:
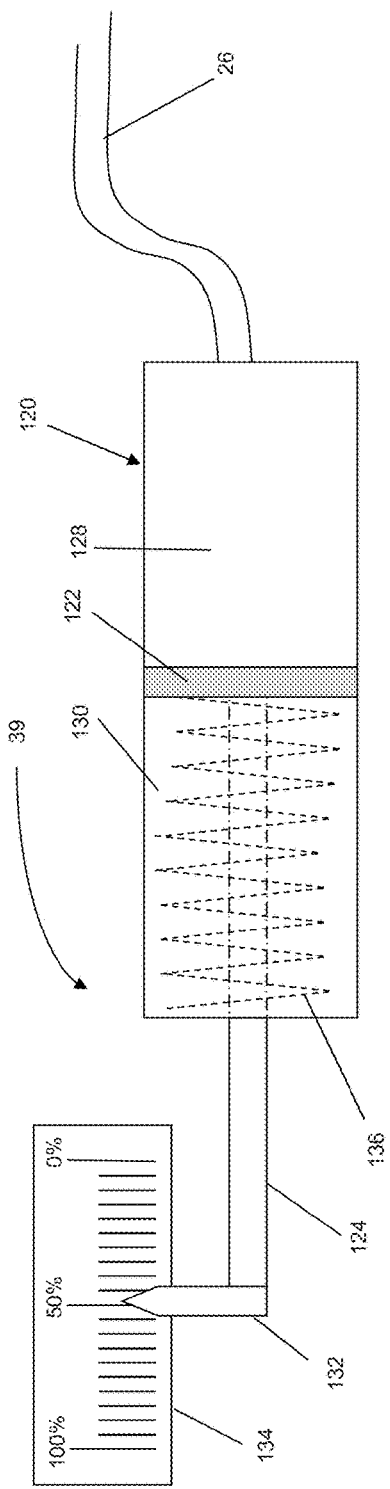

Referring now to FIG. 6, flow line 26 is fluidly coupled to a position indicator 39, which, in this embodiment, includes a cylinder 120, piston 122, rod 124, pointer 132, and scale 134. Piston 122 separates chambers 128, 130. Piston 122 is coupled to rod 124, such that the rod 124 moves when piston 122 moves. Rod 124 extends through the housing of cylinder 120, and the distal end of rod 124 is connected to a pointer 132 and scale 134. As the back pressure control valve (1, 40) opens, a volume of fluid is displaced from chamber 38 (FIGS. 2, 4) into chamber 128, which in turn moves pointer 132; conversely, as the pressure control valve (1, 40) closes, fluid is pulled back into chamber 38 (FIGS. 2, 4) from chamber 128, causing a corresponding move for piston 122. Scale 134 includes graduations such that the position of pointer 132 provides an indication of the position of the valve (e.g., fully closed, 0%, fully open, 100%, or therebetween). A spring 136 may also be provided to ensure that piston 122 and pointer 132 return to "zero" when the back pressure control valve completely closes. Referring now to FIG. 7, where like numerals represent like parts, scale 134 may be a radial scale.

In the embodiments of FIGS. 5-7, using a similar bore diameter for cylinder 37 (FIGS. 2, 4) and cylinders 102, 120, may provide a direct relationship between the displacement of fluid/pistons within the cylinders. Alternatively, the system may be adapted for use with cylinders having differing bore sizes, which may be advantageous in applications where one end of the system (cylinder 37 or cylinders 102, 120) has limited space availability.

Figure 9:
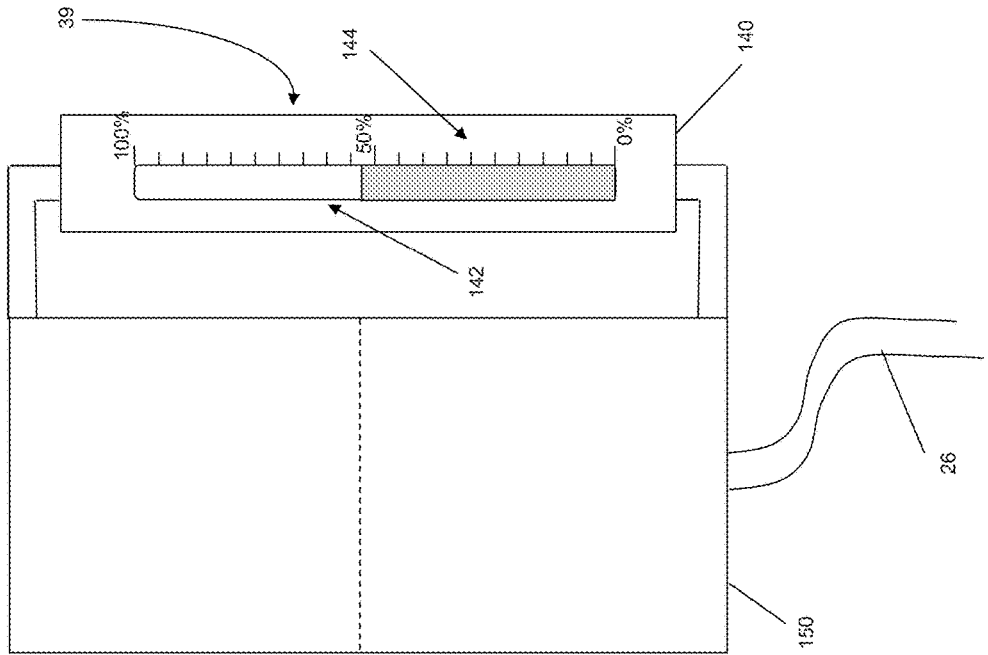
Figure 8:
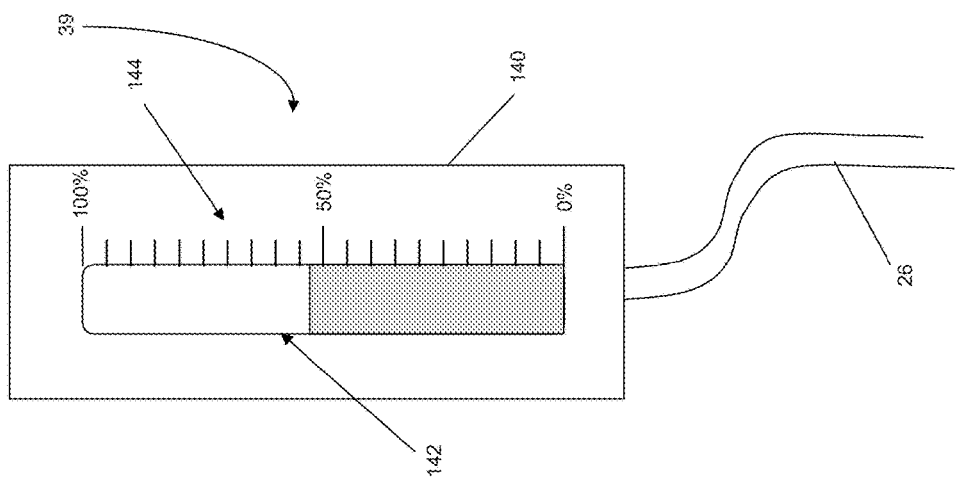

Referring now to FIGS. 8 and 9, as opposed to a piston/cylinder arrangement of FIGS. 5-7, the position indicator 39 may be based on the level of fluid in a remote vessel fluidly connected via flow line 26 to cylinder 37. As shown in FIG. 8, position indicator 39 may include a vessel 140 having a sight glass 142 and graduations 144. As the back pressure control valve (1, 40) opens, a volume of fluid is displaced from chamber 38 (FIGS. 2, 4) into vessel 140, causing the level in vessel 140 to increase; conversely, as the pressure control valve (1, 40) closes, fluid is pulled back into chamber 38 (FIGS. 2, 4) from vessel 140 causing a corresponding decrease in level in vessel 140. Graduations 144 or other markings on or proximate vessel 140 may then provide an indication of the position of the valve (fully closed, 0%, fully open 100%, or therebetween) based on the level of fluid within vessel 140. Similarly, as shown in FIG. 9, vessel 140 may be fluidly coupled to a primary fluid vessel 150 that is in fluid communication with flow line 26 and chamber 38, the level of fluid in vessel 140 corresponding to that in vessel 150 and providing the desired position indication. The scaling from 0% to 100% may be over the entire length of the sight glass or only a portion thereof, depending upon the relative volumes or dimensions of the vessels 140, 150.

While various embodiments for remotely indicating the position of the drilling choke are illustrated in FIGS. 5-9, one skilled in the art can readily envision other means for utilizing the hydraulic coupling of a rod 60 or mandrel 17 to provide a remote indication of the position of the drilling choke.

Each of the embodiments illustrated in FIGS. 5-9 provide hydraulic measurement of the position. Sufficient fluid must be provided to fill the fluid chambers (38, 108, 128) and/or vessels (140, 150) to provide an accurate measurement of the position. Too much fluid may result in a non-zero reading when the valve is closed, while too little fluid may result in a reading of less than 100% when the valve is fully opened. While not illustrated, bleed and fill lines may be provided to add or remove fluid from the chambers and vessels. To ensure proper position indication, the fluid level and/or scaling should be adequately adjusted (calibrated) prior to use. For example, for the embodiments illustrated in FIGS. 8 and 9, the choke valve may be fully closed and sufficient fluid pumped in to fill chamber 38 and flow line 26, up to a desired 0% indication point. Then, after fully opening the valve, the position of the 100% reading may be noted, and graduations may be marked between the 0% and 100% points.

There should be no pressure or as little pressure as possible placed upon the fluid in chamber 38 and position indicator devices 39. In this manner, the monitoring and measurement of the position of the valve (from full closed to full opened) does not interfere with normal valve operations (i.e., does not add a pressure bias to mandrel 17 or rod 60).

Locations where oil or gas wells are being drilled generally have limited resources available for continuous use, such as utilities including air, electricity, etc. As a result, it is not uncommon, for example, for the air supply or electrical power to a back pressure control system to be temporarily interrupted. The hydraulic position indicators disclosed herein thus negate the need for these utilities, thereby improving reliability of measurement and drilling operations.

Additionally, the hydraulic position indicators disclosed herein may be more economical than the currently used electronic position indicators. Further, the hydraulic position indicators disclosed herein are better suited for use in the hazardous and harsh drilling environments. Flow line 26, connecting cylinder 37 to the remote position indicator device 39 may be any length, may require no special hardware or skills to attach, and may be run through virtually any environment safely and reliably.

Further, the hydraulic position indicator devices 39 disclosed herein may be placed outside of the harsh environment typically encountered proximate the choke valve. This may in turn allow for electronic valve position measurement using electronics having less stringent design requirements. For example, for the embodiment of FIG. 8 or 9, vessels 140, 150 may be attached to a level control measuring device (not illustrated), where the measured level may be correlated to the valve position, data for one or both of which may be transmitted to a remote monitoring or control station. As another example, the indicators in FIGS. 6 and 7 may be adapted for electronic valve position measurement by attaching the stem of the cylinder to the electronic sensor as well as the pointer, thus providing local position indication and a digital signal to be forwarded on to another system. For purely electronic measurement, the pointer in FIGS. 6-7 could be completely removed and an electronic sensor attached instead.

At a drill site, the above described hydraulic position indicators of embodiments disclosed herein may be used to monitor or control one or more operating pressures within a subterranean borehole that includes a choke valve or choke assembly, such as those illustrated in FIGS. 1 and 3. The choke valve or choke assembly (1, 40) may include a housing (3/21, 42/48) having an inlet (5, 46), an outlet (7, 44), a bore, a choke member (15, 70) disposed in the bore for controlling a flow of a fluid from the inlet to the outlet, and a rod (17, 60) coupled to the choke member and extending through the housing. A position indicating system according to embodiments disclosed herein may be attached to the choke valve (1, 40) as described above to provide for determination of the position of the choke member during operation of the valve. Referring again to FIGS. 2 and 4, a cylinder 37 (including a housing having an axial bore and a piston 36 disposed in the axial bore and separating the axial bore into a first chamber 33 and a second chamber 38) is provided, the piston 36 of which may be directly or indirectly coupled to the rod (17, 60) of the choke assembly. Second chamber 38 may be fluidly coupled to a position indicating device 39, wherein movement of the choke member (15, 70) causes a corresponding movement in the rod (17, 60) and the piston 36, resulting in a change in the volume of fluid in the second chamber 38 and a corresponding change in the volume of fluid in the position indicating device 39, thereby indicating a change in the position of the choke member. A position of the choke member may then be determined using the position indicating device 39, as based on the relative volume of liquid displaced into position indicating device 39, as described with respect to FIGS. 5-9.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method of controlling one or more operating pressures within a subterranean borehole comprising:
   positioning a choke assembly at a surface above the borehole, the choke assembly comprising a housing having an inlet, an outlet, a bore, a choke member disposed in the bore for controlling a flow of a fluid from the inlet to the outlet, and a first rod coupled to the choke member and extending through the housing,
   providing a cylinder located outside, and remote with respect to, the housing of the choke assembly, wherein the cylinder comprises:
      a housing having an axial bore; and
      a first piston disposed in the axial bore and separating the axial bore into a first chamber and a second chamber;
   controlling the choke member within the bore by changing a volume of fluid in the first chamber and the second chamber to move the first piston;
   directly or indirectly coupling the first rod of the choke assembly to the first piston;
   directly or indirectly coupling the first piston to a second rod and a second piston, the second piston movable within a third chamber;
   fluidly coupling the third chamber to a position indicating device, wherein movement of the choke member causes a corresponding movement in the first rod and the first piston, resulting in movement of the second rod and second piston to change a volume of fluid in the third chamber and a corresponding change in a volume of fluid in the position indicating device, thereby indicating a change in the position of the choke member; and
   determining a position of the choke member using the position indicating device.

2. The method of claim 1, further comprising calibrating the position indicating device.

3. The method of claim 1, further comprising disposing a fluid in at least one of the third chamber, the position indicating device, and a flow conduit fluidly coupling the third chamber to the position indicating device.

4. The method of claim 1, further comprising transmitting data for the determined position of the choke member.

5. The method of claim 1, wherein the position indicating device comprises:
   a housing having an axial bore;
   a third piston disposed in the axial bore and separating the axial bore into a fourth chamber and a fifth chamber, wherein the fourth chamber is fluidly connected to the third chamber;
   wherein a change in the volume of fluid in the third chamber causes a corresponding change in a volume of fluid in the fourth chamber and the position of the third piston.

6. The method of claim 5, wherein the position indicating device further comprises:
- a sight glass for visual determination of the position of the third piston; and
- a scale including graduations proximate the sight glass to indicate a corresponding position of the choke member.

7. The method of claim 5, wherein the position indicating device further comprises:
- a third rod coupled to the third piston and extending through the housing;
- a pointer directly or indirectly coupled to the third rod, wherein a change in the volume of fluid in the third chamber causes a corresponding change in the volume of fluid in the fourth chamber, the position of the third piston, and the position of the pointer; and
- a scale proximate the pointer including graduations indicating a corresponding position of the choke member based upon the position of the pointer.

8. The method of claim 6 or claim 7, wherein the position indicating device further comprises a spring positioned in the fifth chamber and configured to move the third piston when a volume of fluid returns from the fourth chamber to the third chamber.

9. The method of claim 1, wherein the position indicating device comprises:
- a vessel fluidly coupled to the third chamber, wherein a change in the volume of fluid in the third chamber causes a corresponding change in the volume of fluid in the vessel;
- a sight glass directly or indirectly coupled to the vessel for visually determining a level of fluid within the vessel; and
- a scale including graduations proximate the sight glass to indicate a corresponding position of the choke member based upon the level of fluid within the vessel.

10. The method of claim 9, further comprising:
measuring a level of fluid in the vessel; and
determining a position of the choke member based upon the measured level of fluid in the vessel.

11. The method of claim 1, wherein the first rod of the choke assembly has a first end and a second end located opposite with respect to the first end of the first rod, the first end of the first rod is coupled to the choke member and the second end of the first rod is directly or indirectly coupled to the first piston of the cylinder.

12. The method of claim 1, further comprising:
controlling back pressure of fluid returning from the borehole using the choke assembly positioned at the surface above the borehole.

* * * * *